(12) United States Patent
Fukumoto et al.

(10) Patent No.: US 10,723,308 B2
(45) Date of Patent: Jul. 28, 2020

(54) GAS GENERATOR

(71) Applicant: DAICEL CORPORATION, Osaka-shi, Osaka (JP)

(72) Inventors: Kenji Fukumoto, Tatsuno (JP); Tomoharu Kobayashi, Tatsuno (JP)

(73) Assignee: DAICEL CORPORATION, Osaka-Shi (JP)

(*) Notice: Subject to any disclaimer, the term of this patent is extended or adjusted under 35 U.S.C. 154(b) by 27 days.

(21) Appl. No.: 16/313,295

(22) PCT Filed: Jul. 3, 2017

(86) PCT No.: PCT/JP2017/024358
§ 371 (c)(1),
(2) Date: Dec. 26, 2018

(87) PCT Pub. No.: WO2018/020960
PCT Pub. Date: Feb. 1, 2018

(65) Prior Publication Data
US 2019/0152424 A1 May 23, 2019

(30) Foreign Application Priority Data
Jul. 26, 2016 (JP) ................................ 2016-146333

(51) Int. Cl.
*B60R 21/264* (2006.01)
*B60R 21/262* (2011.01)
*B60R 21/261* (2011.01)

(52) U.S. Cl.
CPC ........ *B60R 21/2644* (2013.01); *B60R 21/262* (2013.01); *B60R 21/264* (2013.01); *B60R 2021/2612* (2013.01)

(58) Field of Classification Search
CPC . B60R 21/2644; B60R 21/264; B60R 21/262; B60R 2021/2612; B60R 21/2176; B60R 21/2346; B60R 2021/26011
See application file for complete search history.

(56) References Cited

U.S. PATENT DOCUMENTS 9,051,224 B2 * 6/2015 Mason ................ B60R 21/2644
9,114,778 B2 * 8/2015 Hanano ............... B60R 21/2644
(Continued)

FOREIGN PATENT DOCUMENTS

DE  20 2005 008 938 U1  9/2005
JP  2011-157025 A      8/2011
(Continued)

OTHER PUBLICATIONS

International Search Report (PCT/ISA/210) issued in PCT/JP2017/024358, dated Sep. 12, 2017.
(Continued)

*Primary Examiner* — Darlene P Condra
(74) *Attorney, Agent, or Firm* — Birch, Stewart, Kolasch & Birch, LLP (57) ABSTRACT

The present invention provides a gas generator, including: in a cylindrical housing, a cup-shaped member separating the combustion chamber in a cylindrical housing main body portion from the diffuser portion, the cup-shaped member being disposed such that a bottom surface thereof is positioned on the side of a first end of the cylindrical housing main body portion, an opening thereof is positioned on the side of a second end of the cylindrical housing main body portion, and a first gap which allows the combustion chamber to communicate with the diffuser portion, is formed between the the cup-shaped member and an inner wall surface of the cylindrical housing main body portion; and (Continued)

a filter disposed in a space surrounded by the cup-shaped member and the diffuser portion, the filter being a cup-shaped filter having a base, a circumferential wall and an opening, and the filter being provided such that, the base of the filter abuts on a closed end surface of the diffuser portion, an end surface of the opening of the filter faces the bottom surface of the cup-shaped member, and the circumferential wall of the filter abuts, from inside, on the circumferential wall of the cup-shaped member including a plurality of the communication holes, and being disposed with a second gap formed between the filter and the gas discharge ports.

7 Claims, 5 Drawing Sheets

(56) References Cited

U.S. PATENT DOCUMENTS

| | | | |
|---|---|---|---|
| 9,950,688 B2* | 4/2018 | Yamashita | B60R 21/261 |
| 2006/0273564 A1* | 12/2006 | McCormick | C06D 5/06 |
| | | | 280/740 |
| 2010/0290959 A1* | 11/2010 | Yamazaki | B60R 21/261 |
| | | | 422/165 |
| 2011/0187088 A1 | 8/2011 | Hanano et al. | |
| 2014/0239623 A1* | 8/2014 | Tokuda | B60R 21/272 |
| | | | 280/737 |
| 2016/0214564 A1* | 7/2016 | Imoto | B60R 21/2644 |
| 2016/0257280 A1* | 9/2016 | Hanano | B60R 21/2644 |
| 2017/0151543 A1 | 6/2017 | Noda et al. | |
| 2017/0349136 A1 | 12/2017 | Hanano et al. | |
| 2019/0126885 A1* | 5/2019 | Fukumoto | B60R 21/264 |

FOREIGN PATENT DOCUMENTS

| | | |
|---|---|---|
| JP | 2016-007559 A | 1/2016 |
| JP | 2016-107689 A | 6/2016 |

OTHER PUBLICATIONS

Written Opinion (PCT/ISA/237) issued in PCT/JP2017/024358, dated Sep. 12, 2017.

English translation of the Written Opinion of the International Searching Authority (form PCT/ISA/237), dated Sep. 12, 2017, for International Application No. PCT/JP2017/024358.

* cited by examiner

GAS GENERATOR

TECHNICAL FIELD

The present invention relates to a gas generator for use in an airbag apparatus mounted on an automobile.

DESCRIPTION OF RELATED ART

DE202005008938U discloses a hybrid gas generator in which both a pressurized gas and a gas generating agent are used as the gas source. A housing in which a gas generating agent 12 and an ignition device 10 are mounted is disposed at one end of a bottle filled with a pressurized gas. On the opposite end thereto, another housing, in which orifices 28 are arranged radially in a circumferential wall 30 and a filter 24 is inserted, is disposed. An inlet port 16 at one end of the bottle is closed with an inlet film 18, and an outlet port 20 at the opposite end is closed with an outlet port film 22. The filter 24 in the gas generator is located outside the bottle filled with the pressurized gas, adjacent to the outlet port 20.

SUMMARY OF INVENTION

The present invention provides a gas generator, including:
a cylindrical housing including a cylindrical housing main body portion and a diffuser portion;
an ignition device provided at a first end of the cylindrical housing main body portion, and the diffuser portion provided with a plurality of gas discharge ports and closing a second end on the axially opposite side to the first end;
a combustion chamber storing a gas generating agent and defined in an internal space of the cylindrical housing main body portion;
a cup-shaped member separating the combustion chamber from the diffuser portion, the cup-shaped member having a bottom surface, a circumferential wall provided with a plurality of communication holes, and an opening, the cup-shaped member being disposed such that
the bottom surface thereof is positioned on the side of the first end of the cylindrical housing main body portion,
the opening thereof is positioned on the side of the second end, and
a first gap which allows the combustion chamber to communicate with the diffuser portion, is formed between the circumferential wall thereof and an inner wall surface of the cylindrical housing main body portion to which the circumferential wall opposes radially outwardly; and
a filter disposed in a space surrounded by the cup-shaped member and the diffuser portion, the filter being a cup-shaped filter having a base, a circumferential wall and an opening, and the filter being provided such that,
the base of the filter abuts on a closed end surface of the diffuser portion,
an end surface of the opening of the filter faces the bottom surface of the cup-shaped member, and
the circumferential wall of the filter abuts, from inside, on the circumferential wall of the cup-shaped member including the plurality of the communication holes, and being disposed with a second gap formed between the circumferential wall and the gas discharge ports.

BRIEF DESCRIPTION OF THE DRAWINGS

The present invention will become more fully understood from the detailed description given hereinbelow and the accompanying drawings which are given byway of illustration only, and thus are no limitative of the present invention and wherein.

DETAILED DESCRIPTION OF INVENTION

With the filter disposed as in DE202005008938U, it is assumed that a large load is applied on the filter 24 due to concentration of the gas discharged from the outlet port 20 and a cooling effect of the filter is not exhibited sufficiently. Moreover, it is assumed that a gas can hardly pass through the entire filter and a function of the filter is difficult to be exerted because of the structure in which the filter 24 takes up an entire interior of a member 32 equivalent to a diffuser and is in contact with the radially arranged orifices 28.

With the gas generator of the present invention, a filter is not expanded and deformed radially outwardly by pressure of a combustion gas, and a space is secured between the filter and gas discharge ports. A function of the filter is exerted as designed and an output of the gas generator is stable, so that the gas generator has high output reproducibility.

The cylindrical housing used in the present invention is made of metal such as iron and stainless steel and includes a cylindrical housing main body portion and a diffuser portion. The cylindrical housing main body portion and the diffuser portion may be joined together by welding, or may be integrally molded in advance.

An electronic igniter used in a known gas generator or a combination of an electric igniter and a transfer charge may be used as an ignition device. A known gas generating agent or black powder and the like can be used as the transfer charge.

In the diffuser portion, a plurality of gas discharge ports are formed in a circumferential wall of the cylindrical housing (the diffuser portion), and these ports are closed by a closing member such as a seal tape.

The gas generating agent filled in a combustion chamber can be a gas generating agent used in known gas generators.

A cup-shaped member separates the combustion chamber from the diffuser portion. Here, "separates" means that a space of the combustion chamber and an internal space of the diffuser portion are partitioned by the cup-shaped member, but a gas discharge passage from the combustion chamber to the diffuser portion is secured. The gas discharge passage from the combustion chamber to the diffuser portion is a passage including the combustion chamber, a first gap, a plurality of communication holes, a cup-shaped filter and the diffuser portion.

The cup-shaped member only needs to be disposed such that the first gap which allows the combustion chamber to communicate with the diffuser portion is secured between an inner wall surface of the housing main body portion and the cup-shaped member. For example, the cup-shaped member is fixed in the following aspects:

(I) An aspect in which an annular protrusion (an annular stepped surface) protruding inward is formed between the cylindrical housing main body and the diffuser portion, and an end surface of an opening of the cup-shaped member abuts against the annular protrusion (the annular stepped surface);

(II) An aspect in which, in the aspect (I), the cup-shaped member is provided with an enlarged diameter portion at the opening, and the enlarged diameter portion abuts against the annular protrusion (the annular stepped surface);

(III) An aspect in which, in the aspect (I), the cup-shaped member is formed such that an outer diameter (d1) of a bottom surface and an outer diameter (d2) of the opening satisfy a relationship of d2>d1 and a circumferential wall from the bottom surface to the opening is an inclined surface, and the end surface of the opening abuts against the annular protrusion (the annular stepped surface);

(IV) An aspect in which an inner diameter (D1) of the cylindrical housing main body and an inner diameter (D2) of the diffuser portion satisfy a relationship of D1>D2 so as to form an annular stepped surface at a boundary thereof, and the opening of the cup-shaped member of the aspects (I), (II) and (III) abuts against the annular stepped surface;

(V) An aspect in which a cup-shaped member is formed such that an enlarged diameter portion is provided at an opening and a folded-back portion folded back from the enlarged diameter portion toward a bottom surface is further provided, and an outer diameter of the folded-back portion and an inner diameter of the cylindrical housing are adjusted such that the folded-back portion of the cup-shaped member is press-fitted into an inner wall surface of the cylindrical housing; and (VI) An aspect in which a cup-shaped member is formed such that an outer diameter (d1) of a bottom surface and an outer diameter (d2) of an opening satisfy a relationship of d2>d1, a circumferential wall from the bottom surface to the opening is an inclined surface and a folded-back portion folded back from an enlarged diameter portion at the opening toward the bottom surface is further provided, and an outer diameter of the folded-back portion and an inner diameter of the cylindrical housing are adjusted such that the folded-back portion of the cup-shaped member is press-fitted into an inner wall surface of the cylindrical housing.

The filter is arranged such that a base thereof abuts against a closed end surface of the diffuser portion and an end surface of an opening thereof faces the bottom surface of the cup-shaped member. In order to block an axial movement of the filter, for example, the filter is press-fitted to the cup-shaped member, or the opening of the filter abuts against a protrusion formed on an inner circumferential surface of the circumferential wall of the cup-shaped member. The opening of the filter may be in touch with the bottom surface of the cup-shaped member. The circumferential wall of the filter abuts from inside against the circumferential wall of the cup-shaped member including the plurality of the communication holes, and thereby the filter is radially supported. Since the filter is disposed to face the gas discharge ports via the second gap, the gas passes through the entire surface of the filter facing the second gap, and thus a function of the filter is exerted sufficiently.

In the gas generator of the present invention, a combustion gas generated by combustion of the gas generating agent in the combustion chamber passes through the combustion chamber, the first gap, the plurality of the communication holes and the circumferential wall of the cup-shaped filter in a portion closer to the end surface of the opening, and enters the filter. After that, the gas passes through the circumferential wall of the same cup-shaped filter in a portion facing the second gap, ruptures the seal tape, and is discharged from the gas discharge ports.

The following effects (i) to (iii) are obtained by the gas generator of the present invention that operates in the above manner.

(i) In the case that the filter used in the gas generator is a cylindrical filter having a uniform thickness, it is conceivable that the circumferential wall facing the second gap expands radially outwardly and narrows the second gap as the combustion gas flows into the cylindrical filter and pressure is increased. When the second gap is narrowed like this, the combustion gas tends to flow through only the part of the circumferential wall of the cylindrical filter facing the gas discharge ports, and as a result, the cooling and filtering effects are deteriorated. Further, when the circumferential wall of the filter expands radially outwardly, the abutment between the filter and the end surface of the diffuser portion is released, so that short-passing of the combustion gas occurs, that is, part of the combustion gas reaches the gas discharge ports without passing through the filter, which deteriorates the cooling and filtering effects.

In the gas generator of the present invention, since the base of the filter is arranged to abut against the closed end surface of the diffuser portion, the base and the circumferential wall closer to the base of the filter facing the second gap hardly deform even when a load is applied to the filter from inside to outside due to a flow of the combustion gas. Therefore, the second gap is unlikely narrowed and the gas is cooled and filtered by the entire circumferential wall of the filter facing the second gap. A function of the filter is exerted as designed, and an output of the gas generator is stable, so that the gas generator has high output reproducibility. In other words, the filter has a partially increased thickness on the one end side thereof based on a conventional cylindrical filter, and the one end side with the increased thickness corresponds to the base of the filter. The effect (i) is attributed to the structural reinforcement of the filter at a most prone-to-deform portion thereof and arrangement of such a filter in combination with the second gap. The filter is therefore not limited to those with a completely closed base. The base of the filter may have a hole with a smaller diameter than that of the opening of the filter as long as the base serves to prevent deformation during a normal operation of the gas generator.

(ii) The combustion gas passes through the same filter twice, so that the cooling effect and the filtering effect are enhanced as compared to a case in which the combustion gas passes through the filter only once. In comparison to a case in which a filter is disposed at two locations separately, an amount of filter is reduced, and components necessary for fixing a filter are decreased.

(iii) Further, the combustion gas easily contacts with irregular surfaces of the filter and the contact area is large, so that combustion residues contained in the combustion gas easily adhere to and are easily collected by the cup-shaped filter.

In a preferred aspect of the gas generator of the present invention, the filter is the cup-shaped filter having a base, a circumferential wall, an opening and an annular portion protruding radially outwardly from the base, the base of the filter abuts against the closed end surface of the diffuser portion, the annular portion abuts against the closed end surface and the circumferential wall of the diffuser portion, an end surface of the opening of the filter is in touch with the bottom surface of the cup-shaped member, the circumferential wall of the filter abuts from inside against the circumferential wall of the cup-shaped member including the plurality of the communication holes, and disposed with a second gap formed between the circumferential wall and the gas discharge ports.

In this aspect, the filter has an annular portion protruding radially outwardly from the base, and the annular portion abuts on both of the closed end surface and the circumferential wall of the diffuser portion. Thereby, the annular portion has practically the same width as that of the second gap. In the gas generator according to this aspect, the base and the circumferential wall closer to the base of the filter, facing the second gap hardly expands when a load is applied to the filter from inside to outside due to a flow of the combustion gas. According to this aspect, provision of the annular portion equals to a partial increase in thickness of the circumferential wall, and by a combination of the annular portion with the base, the second gap further is prevented from being narrowed. As a result, the combustion gas is cooled and filtered by the circumferential wall of the filter in the entire part facing the second gap.

In a further preferable aspect of the gas generator of the present invention, the filter is a cylindrical filter having a first circumferential wall having a larger inner diameter ($r1$) on the side of the cup-shaped member, a second circumferential wall having a smaller inner diameter ($r2$) on the side of the diffuser portion ($r1>r2$), and an annular surface formed between the first circumferential wall and the second circumferential wall by the difference in inner diameter, an end surface of the second circumferential wall of the filter abuts against the closed end surface of the diffuser portion, an end surface of the first circumferential wall abuts against the bottom surface of the cup-shaped member, the first circumferential wall abuts, from inside, against the circumferential wall of the cup-shaped member including the plurality of the communication holes, and the second circumferential wall is disposed with the second gap formed between the second circumferential wall and the gas discharge ports, and the plurality of the communication holes of the cup-shaped member face only the first circumferential wall of the cylindrical filter, and the plurality of the gas discharge ports of the diffuser portion face only the second circumferential wall of the cylindrical filter via the second gap.

A first annular end surface of the first circumferential wall of the cylindrical filter abuts against the bottom surface of the cup-shaped member, and a second annular end surface abuts against the closed end surface of the diffuser portion. As the second annular end surface abuts against the closed end surface of the diffuser portion, one end of the filter is closed, which forms a practically cup-shaped filter.

In the gas generator according to this aspect, used is a filter having a first circumferential wall with a larger inner diameter ($r1$), a second circumferential wall with a smaller inner diameter ($r2$) and an annular surface formed between the first circumferential wall and the second circumferential wall by the difference in inner diameter. The first circumferential wall is located on the side of the opening and the second circumferential wall is located on the side of the base. As the inner diameter ($r1$) of the first circumferential wall and the inner diameter ($r2$) of the second circumferential wall satisfy the relationship of $r1>r2$, a radial width ($w1$) of the first circumferential wall and a radial width ($w2$) of the second circumferential wall satisfy a relationship of $w2>w1$. It is preferable that $w2>w1$ is in the range of 1.2 to 3.8. The filter has a constant outer diameter.

In the gas generator according to this aspect, the plurality of the gas discharge ports of the diffuser portion face only the second circumferential wall of the cylindrical filter having a radially larger thickness via the second gap. The second circumferential wall and the first circumferential wall which is adjacent to the second circumferential wall hardly deform, and the second gap is unlikely to be narrowed even when a load is applied to the filter from inside to outside due to a flow of the combustion gas. Therefore, the combustion gas is cooled and filtered by the first circumferential wall and the entire second circumferential wall of the filter which face the second gap. An amount of the filter is increased correspondingly by the increased radial thickness of the second circumferential wall, which enhances the filtering function. The gas discharge efficiency is maintained since the combustion gas flows through a center hole surrounded by the second circumferential wall and through an annular surface. Namely, according to this aspect, not only the thickness of a prone-to-deform portion in the circumferential wall is increased, but also a cooling efficiency and a filtering efficiency are improved by the increased contact area provided with the annular surface. According to this aspect, lengths of the first circumferential wall and the second circumferential wall may be adjusted such that the second circumferential wall radially faces the entire second gap.

In a further preferable aspect of the gas generator of the present invention, the filter is a cup-shaped filter having a base, a circumferential wall and an opening, an axial thickness of the base is larger than a radial thickness of the circumferential wall, the base of the cup-shaped filter abuts against the closed end surface of the diffuser portion, the end surface of the opening of the cup-shaped filter is touch with the bottom surface of the cup-shaped member, the circumferential wall of the cup-shaped filter abuts from inside against the circumferential wall of the cup-shaped member including the plurality of the communication holes, a side surface of the base is disposed with a second gap formed between the side surface of the base and the gas discharge ports, and the plurality of the communication holes of the cup-shaped member face only the circumferential wall of the cup-shaped filter, and the plurality of the gas discharge ports of the diffuser portion face only the side surface of the base of the cup-shaped filter via the second gap.

According to the gas generator of this aspect, the base of the filter is a portion from an inner end surface inside the filter to an outer end surface abutting against the closed end surface of the diffuser portion. An outer circumferential surface of the base corresponds to the side surface of the base. In other words, in the gas generator according to this aspect, an axial thickness of the base of the filter is increased, and the gas discharge ports face only the side surface of the base of the filter (where the axial thickness is increased) via the second gap. The axial thickness of the base of the filter ranges at least from the closed end surface of the diffuser portion to an end of the gas discharge port on the side of the cup-shaped member. In the gas generator according to this aspect, the base with the larger thickness hardly deforms when a load is applied to the filter from inside to outside due to a flow of the combustion gas. Therefore, the second gap is unlikely to be narrowed, and the combustion gas is cooled and filtered by part of the first circumferential wall facing the second gap and the entire base of the filter. Further, an amount of the filter is increased correspondingly by the increased axial thickness of the base, which enhances a filtering function. The gas discharge efficiency is maintained since the combustion gas flows through a surface of the base on the side of an opening. According to this aspect, the axial thickness of the base may be adjusted such that the base radially faces the entire second gap.

In a further preferable aspect of the gas generator of the present invention, the filter is an cup-shaped filter having a base with a recess, the circumferential wall and the opening, the diffuser portion has a protrusion projecting inward from the closed end surface, and the protrusion on the closed end surface of the diffuser portion is fitted into the recess of the cup-shaped filter.

With the recess in the base of the filter fitted to the protrusion projecting inward from the closed end surface of the diffuser portion, the filter having the base with a larger thickness is supported and not displaced radially.

According to a further preferable aspect of the gas generator of the present invention, the base of the cup-shaped filter has a length L1 of 0.3 to 0.7 L, where L is a length from an end surface of the base to an end surface of the opening of the cup-shaped filter, and based on L, a length L2 from the closed end surface of the diffuser portion to an end of the gas discharge port on the side of the cup-shaped member is in a range of 0.35 to 0.55L.

By adjusting the thickness of the base of the filter and the positions of the gas discharge ports such that L2 is within the range of L1, the cooling and filtering effects for the combustion gas of the filter are enhanced.

In the gas generator of the present invention, a shape of the filter and an arrangement of the filter with respect to other components are adjusted, so that the filter is prevented from deforming radially outwardly due to pressure of the combustion gas during actuation. Thereby, the second gap is secured as a space between the filter and the gas discharge ports. As a result, a function of the filter is exerted as designed, an output of the gas generator is stable and the gas generator has high output reproducibility.

The gas generator of the present invention is used as a gas generator for an airbag apparatus mounted on various automobiles.

Figure 1:
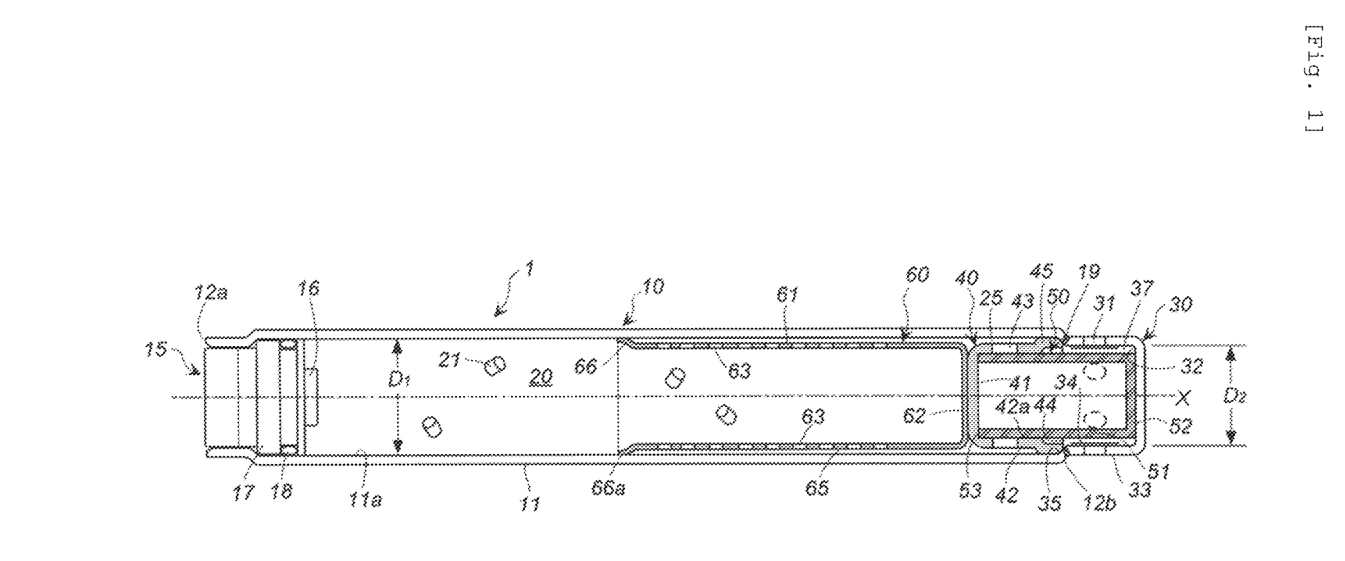
FIG. 1 shows a cross-sectional view in a direction of the axis X of a gas generator of the present invention.

Description of Embodiments (1) Gas Generator of FIG. 1

In a gas generator 1 shown in FIG. 1, a cylindrical housing 10 which is an outer shell container, includes a cylindrical housing main body portion 11 and a diffuser portion 30. The cylindrical housing main body portion 11 and diffuser portion 30 are made of metal such as stainless steel.

An igniter 15 is installed at a first end 12*a* of the cylindrical housing main body portion 11. In the igniter 15, the main body of the igniter 15 has an ignition portion 16 and is fixed to an igniter collar 17. A known transfer charge may be used in combination therewith as required. An O-ring 18 for blocking moisture is disposed between the igniter collar 17 and an inner wall surface 11*a* of the cylindrical housing main body portion 11.

A second end 12*b* on the opposite side to the first end 12*a* of the cylindrical housing main body portion 11 in the direction of the axis X is closed by the diffuser portion 30 provided with gas discharge ports 31. The diffuser portion 30 has a closed end surface 32 and a circumferential wall 33. In the embodiment shown in FIG. 1, the cylindrical housing main body portion 11 and the diffuser portion 30 are welded together at a weld portion 19. A plurality of the gas discharge ports 31 are circumferentially formed at equal intervals and closed from inside with an aluminum seal tape 34. In the embodiment shown in FIG. 1, an annular stepped surface 35 is formed at a boundary between the cylindrical housing main body portion 11 and the diffuser portion 30. The annular stepped surface 35 is formed because an inner diameter (D1) of the cylindrical housing main body portion 11 and an inner diameter (D2) of the diffuser portion 30 are set to satisfy a relation of D1>D2. In FIG. 1, the diffuser portion 30 and most part of the cylindrical housing main body portion 11 have a constant inner diameter respectively.

An internal space of the cylindrical housing main body portion 11 is a combustion chamber 20 storing a gas generating agent 21. In accordance with a charging amount of the gas generating agent 21, a retainer may be disposed in the combustion chamber 20 to adjust a volume of the combustion chamber 20, as required.

A cup-shaped member 40 separates the combustion chamber 20 from the diffuser portion 30. The cup-shaped member 40 is made of iron, stainless steel and the like, and has, as shown in FIG. 1, a bottom surface 41, a circumferential wall 42 provided with communication holes 43, and an opening 44. A plurality of the communication holes 43 are formed circumferentially at equal intervals. An enlarged diameter portion 45 enlarged outward from the circumferential wall 42 is arranged at an end surface of the opening 44 of the cup-shaped member 40. The cup-shaped member 40 is press-fitted into the cylindrical housing main body portion 11 by adjusting respective dimensions of an outer diameter of the enlarged diameter portion 45 and the inner diameter of the cylindrical housing main body portion 11.

A cup-shaped filter 50 is disposed in a space surrounded by the cup-shaped member 40 and the diffuser portion 30. The cup-shaped filter 50 has a circumferential wall 51, a base 52, and an opening opposite to the base 52. In the cup-shaped filter 50, the base 52 abuts against the closed end surface 32 of the diffuser portion 30, and an annular end surface 53 of the opening abuts against the bottom surface 41 of the cup-shaped member 40. The cup-shaped filter 50 is disposed such that the circumferential wall 51 abuts from inside against the circumferential wall 42 of the cup-shaped member 40 including the plurality of the communication holes 43, that is, abutting against an inner wall 42*a* of the circumferential wall 42, and that a second gap 37 is formed between the cup-shaped filter and the gas discharge ports 31. The cup-shaped filter 50 is disposed such that a center axis thereof coincides with the axis X of the cylindrical housing 10.

The communication holes 43 of the cup-shaped member 40 are positioned closer to the annular end surface 53 of the cup-shaped filter 50 to face the first gap 25. The gas discharge ports 31 of the diffuser portion 30 are formed to be positioned closer to the base 52 of the cup-shaped filter 50. The plurality of the communication holes 43 of the cup-shaped member 40 face the circumferential wall 51 of the cup-shaped filter 50, and the plurality of the gas discharge ports 31 of the diffuser portion 30 face the circumferential wall 51 of the cup-shaped filter 50 via the second gap 37. An area (A1) of an abutment portion of the circumferential wall 51 of the cup-shaped filter 50 and the circumferential wall 42 of the cup-shaped member 40 and an area (A2) where the circumferential wall 51 of the cup-shaped filter 50 faces the second gap 37 is such that A2 is about 70% of the total area of A1 and A2 taken as 100%.

In the cylindrical housing main body portion 11, a cylindrical support member 60, which is open on the side of the first end 12a and closed on the side of the second end 12b, is disposed. The cylindrical support member 60 is used to form a filling space for the gas generating agent therein and to support the cup-shaped member 40 and the cup-shaped filter 50 along the direction of axis X. The cylindrical support member 60 may not be used when the cup-shaped member 40 is fixed and the first gap 25 is secured. The filling space is included in the combustion chamber. The cylindrical support member 60 is made of metal such as stainless steel.

The cylindrical support member 60 has a smaller outer diameter than the inner diameter of the cylindrical housing main body portion 11, a cylindrical gap 65 is formed between the cylindrical support member 60 and the cylindrical housing main body portion 11. A plurality of gas passage holes 63 are formed at equal intervals axially and circumferentially in the circumferential wall 61 of the cylindrical support member 60. The combustion chamber 20 and the cylindrical gap 65 intercommunicate with each other via the gas passage holes 63. The cylindrical support member 60 has an enlarged diameter portion 66 at the opening on the side of the igniter 15. An outer circumferential edge 66a of the enlarged diameter portion 66 abuts on the inner wall surface 11a of the cylindrical housing main body portion 11, and the closed end surface 62 abuts on the bottom surface 41 of the cup-shaped member 40.

The outer diameter of the outer circumferential edge 66a is slightly larger than the inner diameter of the cylindrical housing main body portion 11, so that the outer circumferential edge 66a is press-fitted into the inner wall surface 11a of the cylindrical housing main body portion 11 by resiliency of the enlarged diameter portion 66 when the cylindrical support member is disposed in the cylindrical housing main body portion 11. When the enlarged diameter portion 66 is formed in an annular shape, no gap is formed in the press-fitted part.

An operation of the gas generator 1 shown in FIG. 1 will be described.

The igniter 15 is actuated to ignite and burn the gas generating agent 21 inside the combustion chamber 20, whereby combustion gas is generated. The combustion gas flows toward the second end 12b while moving in and out of the cylindrical gap 65 and the filling space for the gas generating agent through the gas passage holes 63 of the cylindrical support member 60. The combustion gas then reaches the first gap 25, and therefrom passes through the communication holes 43 and the circumferential wall 51 closer to the annular end surface 53 of the cup-shaped filter 50 to enter the diffuser portion 30. The combustion gas again flows through the circumferential wall 51 of the cup-shaped filter 50 in a portion facing the second gap 37 to enter the second gap 37. Thereafter, the combustion gas ruptures the seal tape 34 and is discharged from the gas discharge ports 31.

When the combustion gas flows from inside to outside of the cup-shaped filter 50, a load acts on the circumferential wall 51 of the cup-shaped filter 50 in the portion facing the second gap 37 to deform radially outwardly. However, even in such a case, since the cup-shaped filter 50 has the base 52, the circumferential wall 51 facing the second gap 37 hardly deforms radially outwardly. Thereby, the combustion gas passes through the entire portion of the circumferential wall 51 facing the second gap 37, and as a result, cooling and filtering effects are enhanced.

As described above, since a function of the filter is exerted as designed, an output of the gas generator is stable and the gas generator has high output reproducibility. Further, the combustion gas passes through a single cup-shaped filter 50 twice, so that the cooling effect and the filtering effect are enhanced as compared to a case in which the combustion gas passes through the filter only once. In comparison to a case in which a filter is disposed at a plurality of locations separately, an amount of filter is reduced, and components necessary for fixing a filter are omitted. Once the combustion gas enters an inside of the cup-shaped filter 50, combustion residues contained in the combustion gas adhere to and are easily collected by irregularities of an inner wall surface of the filter. Thus the space inside the cup-shaped filter functions as a combustion residue collecting space.

Figure 2:
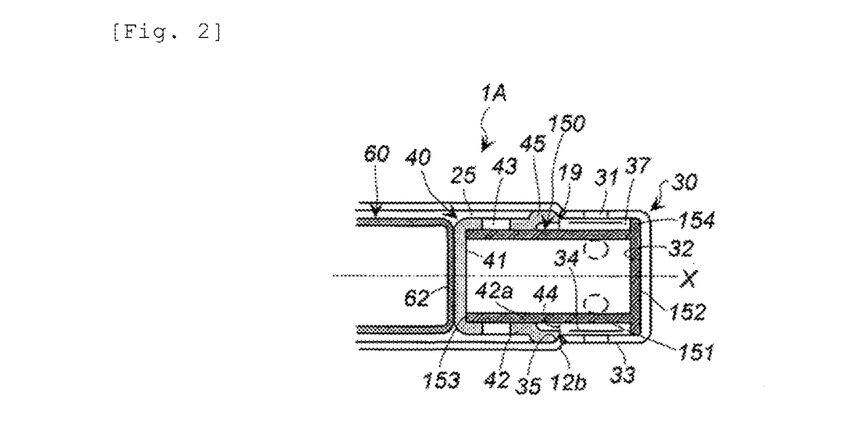
FIG. 2 shows a partial cross-sectional view in a direction of the axis X of a gas generator of another embodiment in which a filter is different from that in FIG. 1.

(2) Gas Generator of FIG. 2

The gas generator 1A show in FIG. 2 is the same as the gas generator 1 shown in FIG. 1 except that a shape of a filter is different.

A cup-shaped filter 150 has a circumferential wall 151, a base 152, and an opening opposite to the base 152, that is, on the axially opposite side to the base 152, and an annular portion 154 protruding outward from the base 152 in a radial direction. In the cup-shaped filter 150, the base 152 abuts against the closed end surface 32 of the diffuser portion 30, the annular portion 154 abuts against the closed end surface 32 and the circumferential wall 33 of the diffuser portion 30, and an annular end surface 153 of the opening abuts against the bottom surface 41 of the cup-shaped member 40. The cup-shaped filter 150 is disposed such that the circumferential wall 151 abuts from inside against the circumferential wall 42 of the cup-shaped member 40 including the plurality of communication holes 43, that is, abutting against an inner wall 42a of the circumferential wall 42, and that a second gap 37 is formed between the cup-shaped filter and the gas discharge ports 31. The cup-shaped filter 150 is disposed such that a center axis thereof coincides with the axis X of the cylindrical housing 10.

The communication holes 43 of the cup-shaped member 40 are positioned closer to the annular end surface 153 of the cup-shaped filter 150 to face the first gap 25. The gas discharge ports 31 of the diffuser portion 30 are formed to be positioned closer to the base 152 of the cup-shaped filter 150. The plurality of the communication holes 43 of the cup-shaped member 40 face the circumferential wall 151 of the cup-shaped filter 150, and the plurality of the gas discharge ports 31 of the diffuser portion 30 face the circumferential wall 151 of the cup-shaped filter 150 via the second gap 37.

An area (A1) of an abutment portion of the circumferential wall 151 of the cup-shaped filter 150 and the circumferential wall 42 of the cup-shaped member 40 and an area (A2) where the circumferential wall 151 of the cup-shaped filter 150 faces the second gap 37 is such that A2 is about 70% of the total area of A1 and A2 taken as 100%.

The gas generator 1A shown in FIG. 2 operates in the same manner as the gas generator 1 shown in FIG. 1. When the combustion gas flows from inside to outside of the cup-shaped filter 150, a load acts on the circumferential wall 151 of the cup-shaped filter 150 in the portion facing the second gap 37 to deform radially outwardly. However, even in such a case, since the cup-shaped filter 150 has the base 152 and the annular portion 154 abuts against the closed end surface 32 and the circumferential wall 33 of the diffuser portion 30, the circumferential wall 151 facing the second gap 37 hardly deforms radially outwardly. Thereby, the combustion gas passes through the entire portion of the circumferential wall 151 facing the second gap 37, and as a result, the cooling and filtering effects are enhanced. As described above, since a function of the filter is exerted as designed, an output of the gas generator is stable and the gas generator has high output reproducibility. Further, the combustion gas passes through a single cup-shaped filter 150 twice, so that the cooling effect and the filtering effect are enhanced as compared to a case in which the combustion gas passes through the filter only once. In comparison to a case in which a filter is disposed at a plurality of locations separately, an amount of filter is reduced, and components necessary for fixing a filter are omitted. Once the combustion gas enters an inside of the cup-shaped filter 150, combustion residues contained in the combustion gas adhere to and are easily collected by irregularities of an inner wall surface of the filter. Thus the space inside the cup-shaped filter functions as a combustion residue collecting space. In the embodiment of FIG. 2, in order to avoid interference between the seal tape 34 and the annular portion 154 during production, the seal tape 34 may be provided on the outer side of the circumferential wall 33 of the diffuser portion 30, or, when it is to be attached to the inner side of the circumferential wall 33, a recess may be formed by cutting part of the inner circumferential surface of the circumferential wall 33 of the diffuser portion 30 where the seal tape 34 is to be attached, and the seal tape 34 is attached in this recess.

Figure 3:
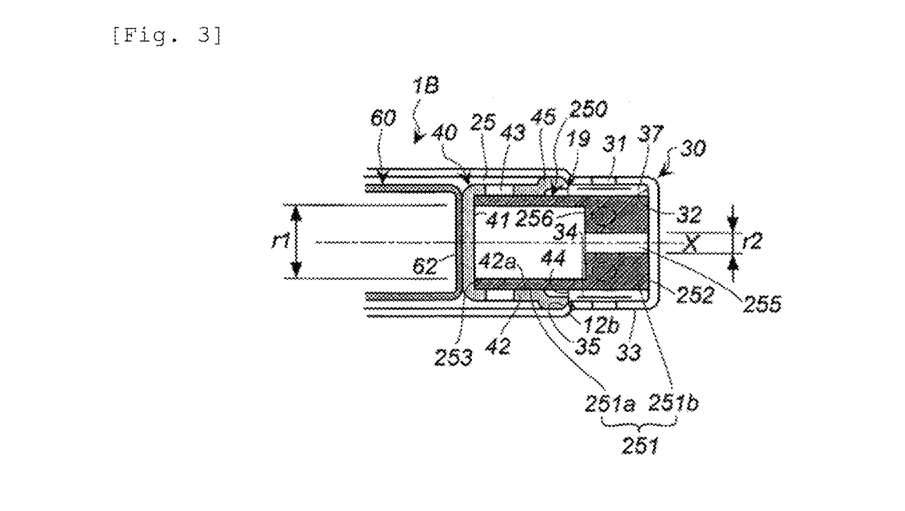
FIG. 3 shows a partial cross-sectional view in a direction of the axis X of a gas generator of another embodiment in which a filter is different from those in FIG. 1 and FIG. 2.

(3) Gas Generator of FIG. 3

The gas generator 1B shown in FIG. 3 is the same as the gas generator 1 shown in FIG. 1 except that a shape of a filter is different. The filter is cylindrical and has a center hole 255 in a base (a closed end surface).

A circumferential wall 251 of a cylindrical filter 250 includes a first circumferential wall 251a having a larger inner diameter (r1) on the side of the cup-shaped member 40, and a second circumferential wall 251b having a smaller inner diameter (r2) on the side of the diffuser portion 30, and these diameters satisfies a relationship of r1>r2. The radial width of the first circumferential wall 251a (w1) and the radial width of the second circumferential wall 251b (w2) satisfy a relationship of w2>w1, and a ratio w2/w1 is about 2.5. The cylindrical filter 250 has an inner annular surface 256 formed by the difference in inner diameter (r1-r2) between the first circumferential wall 251a and the second circumferential wall 251b, and has the center hole 255 surrounded by the second circumferential wall 251b. The cylindrical filter 250 has a first annular end surface 253 with the width w1 on the side of the cup-shaped member 40, and a second annular end surface 252 with the width w2 on the axially opposite side. The second circumferential wall 251b has an axial length L1 of 0.3 to 0.7 L, where L is a length from the second annular end surface 252 (the closed end surface 32) to the first annular end surface 253 at the opening, as shown in FIG. 4.

In the cylindrical filter 250, the first annular end surface 253 on the side of the first circumferential wall 251a abuts on the bottom surface 41 of the cup-shaped member 40, and the second annular end surface 252 is closed by abutting against the closed end surface 32 of the diffuser portion 30, which makes the cylindrical filter 250 in an approximate cup-shape. The cylindrical filter 250 is disposed such that the first circumferential wall 251a abuts from inside against the circumferential wall 42 of the cup-shaped member 40 including the plurality of communication holes 43, that is, abutting against an inner wall 42a of the circumferential wall 42, and that the second gap 37 is formed between the second circumferential wall 251b and the gas discharge ports 31. The cylindrical filter 250 is disposed such that a center axis thereof coincides with the axis X of the cylindrical housing 10.

The communication holes 43 of the cup-shaped member 40 are positioned closer to the first annular end surface 253 of the cylindrical filter 250 to face the first gap 25 and the first circumferential wall 251a of the cylindrical filter 250. The gas discharge ports 31 of the diffuser portion 30 are formed to be positioned closer to the second annular end surface 252 of the cylindrical filter 250.

Figure 4:
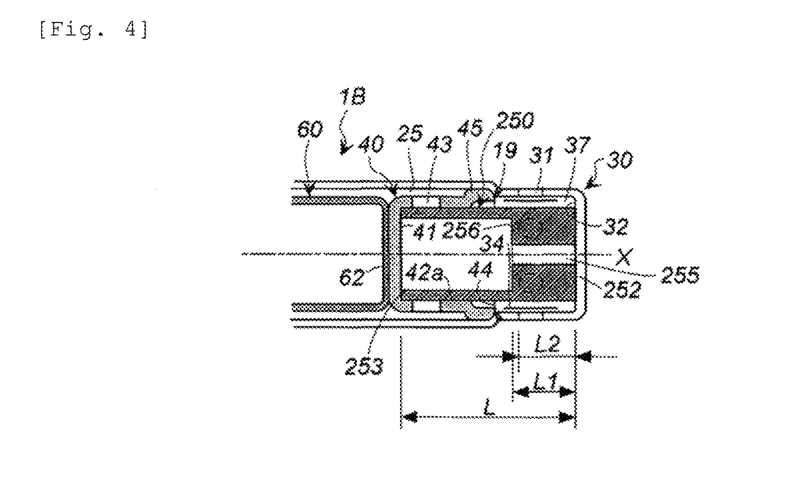
FIG. 4 shows a partial cross-sectional view for explaining a positional relationship between the filter and the gas discharge ports in FIG. 3.

Based on L, a length L2 from the closed end surface 32 of the diffuser portion 30 to an end of the gas discharge port 31 on the side of the cup-shaped member 40 is in a range of 0.35 to 0.55L, and L2 is within the range of L1, as shown in FIG. 4. Thereby, the plurality of the gas discharge ports 31 of the diffuser portion 30 face only the second circumferential wall 251b of the cylindrical filter 250 via the second gap 37.

An area (A1) of an abutment portion of the first circumferential wall 251a of the cylindrical filter 250 and the circumferential wall 42 of the cup-shaped member 40 and an area (A2) where the second circumferential wall 251b of the cylindrical filter 250 faces the second gap 37 is such that A2 is about 70% of the total area of A1 and A2 taken as 100%.

The gas generator 1B shown in FIG. 3 operates in the same manner as the gas generator 1 shown in FIG. 1. The combustion gas passes through the first circumferential wall 251a of the cylindrical filter 250, passes through the second circumferential wall 251b from the inner annular surface 256 and the central hole 255 to enter the second gap 37, then ruptures the seal tape 34 and is discharged from the gas discharge ports 31. When the combustion gas flows from inside to outside of the cylindrical filter 250, a load acts on the second circumferential wall 251b of the cylindrical filter 250 in the portion facing the second gap 37 to deform radially outwardly. However, even in such a case, since the second circumferential wall 251b of the cylindrical filter 250 has a larger width in a radial direction as compared to the first circumferential wall 251a, the second circumferential wall 251b facing the second gap 37 hardly deforms radially outwardly. Thereby, the combustion gas passes through the first circumferential wall 251a and the second circumferential wall 251b which face the second gap 37, and as a result, the cooling and filtering effects are enhanced. As described above, since a function of the filter is exerted as designed, an output of the gas generator is stable and the gas generator has high output reproducibility. Further, the combustion gas passes through a single cylindrical filter 250 twice, so that the cooling effect and the filtering effect are enhanced as compared to a case in which the combustion gas passes through the filter only once. In comparison to a case in which a filter is disposed at a plurality of locations separately, an amount of filter is reduced, and components necessary for fixing a filter are omitted. Once the combustion gas enters an inside of the cylindrical filter 250, combustion residues contained in the combustion gas adhere to and are easily collected by irregularities of an inner wall surface of the filter. Thus the space inside the cylindrical filter functions as a combustion residue collecting space.

Figure 5:
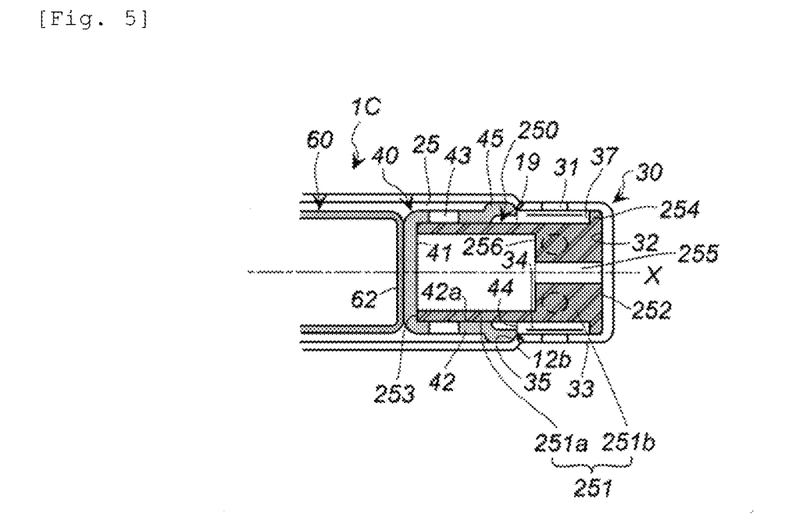
FIG. 5 shows a partial cross-sectional view in a direction of the axis X of a gas generator of another embodiment in which a filter is different from those of FIG. 1 to FIG. 4.

(4) Gas Generator of FIG. 5

The gas generator 1C shown in FIG. 5 is the same as the gas generator 1B shown in FIG. 3 except that a shape of a filter is partially different.

A cylindrical filter 250 includes a first circumferential wall 251a having a larger inner diameter (r1) on the side of the cup-shaped member 40, and a second circumferential wall 251b having a smaller inner diameter (r2) on the side of the diffuser portion 30 (r1>r2). The cylindrical filter 250 has a first annular end surface 253, a second annular end surface 252, and an annular portion 254 protruding radially outwardly from the second annular end surface 252. The annular portion 254 abuts against both of the closed end surface 32 and the circumferential wall 33 of the diffuser portion 30 so as to radially support the cylindrical filter 250 on the side of the second annular end surface 252.

The gas generator 1C shown FIG. 5 operates in the same manner as the gas generator 1B shown FIG. 3, whereby a similar effect is obtained. A function and an effect of the annular portion 254 are the same as those of the gas generator 1A shown in FIG. 2.

Figure 6:
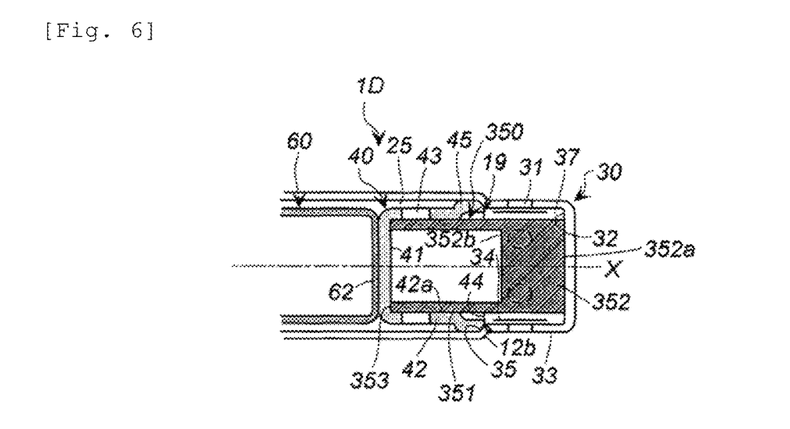
FIG. 6 shows a partial cross-sectional view in a direction of the axis X of a gas generator of another embodiment in which a filter is different from those in FIG. 1 to FIG. 5.

(5) Gas Generator of FIG. 6

The gas generator 1D shown in FIG. 6 is the same as the gas generator 1 shown in FIG. 1 except that a shape of a filter is different.

A cup-shaped filter 350 has a circumferential wall 351, a base 352 having a large thickness in the direction of the axis X, and an opening opposite to the base 352, that is, on the axially opposite side to the base 352. The base of the filter in the gas generator of this embodiment is a portion from an inner end surface 352b inside the filter to an outer end surface 352a abutting against the closed end surface 32 of the diffuser portion. An outer circumferential surface of the base corresponds to the side surface of the base.

Figure 7:
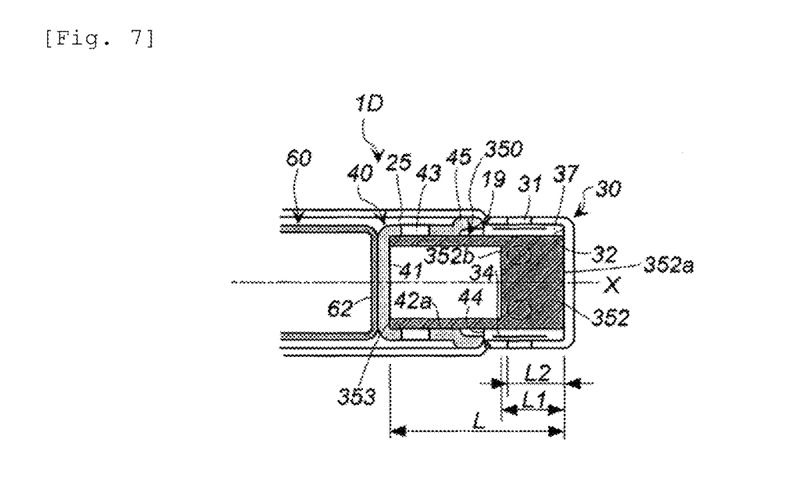
FIG. 7 shows a partial cross-sectional view for explaining a positional relationship between the filter and the gas discharge ports in FIG. 6.

The base 352 has a thickness L1 of 0.3 to 0.7 L in a direction of the axis X, where L is a length from the outer end surface 352a (the closed end surface 32) of the base 352 to the annular end surface 353 of the opening, as shown in FIG. 7.

In the cup-shaped filter, the annular end surface 353 on the side of the opening abuts on the bottom surface 41 of the cup-shaped member 40, and the outer end surface 352a of the base 352 abuts against the closed end surface 32 of the diffuser portion 30. The circumferential wall 351 of the cup-shaped filter 350 abuts from inside against the circumferential wall 42 of the cup-shaped member 40 including the plurality of communication holes 43, that is, abutting against an inner wall 42a of the circumferential wall 42, and that the second gap 37 is formed between the side surface of the base 352 having a large thickness in the direction of the axis X and the gas discharge ports 31. The cup-shaped filter 350 is disposed such that a center axis thereof coincides with the axis X of the cylindrical housing 10.

The communication holes 43 of the cup-shaped member 40 are positioned closer to the annular end surface 353 of the cup-shaped filter 350 to face the first gap 25 and the circumferential wall 351 of the cup-shaped filter 350. The gas discharge ports 31 of the diffuser portion 30 are formed to be positioned closer to the base 352 of the cup-shaped filter 350. Based on L, a length L2 from the closed end surface 32 of the diffuser portion 30 to an end of the gas discharge port 31 on the side of the cup-shaped member 40 is in a range of 0.35 to 0.55L, and L2 is within the range of L1, as shown in FIG. 7. Thereby, the plurality of the gas discharge ports 31 of the diffuser portion 30 face only the base 352 of the cup-shaped filter 350 via the second gap 37. An area (A1) of an abutment portion of the circumferential wall 351 of the cup-shaped filter 350 and the circumferential wall 42 of the cup-shaped member 40 and an area (A2) where the circumferential wall 351 of the cup-shaped filter 350 and the side surface of the base 352 face the second gap 37 is such that A2 is about 70% of the total area of A1 and A2 taken as 100%.

The gas generator 1D shown in FIG. 6 operates in the same manner as the gas generator 1 shown in FIG. 1. The combustion gas passes through the circumferential wall 351 of the cup-shaped filter 350, passes through the inner end surface 352b and the base 352 to enter the second gap 37, then ruptures the seal tape 34 and is discharged from the gas discharge ports 31. The combustion gas flows from inside to outside of the cup-shaped filter 350, a load acts on the circumferential wall 351 of the cup-shaped filter 350 in the portion facing the second gap 37 to deform radially outwardly. However, even in such a case, since the base 352 of the cup-shaped filter 350 has a large thickness in an axial direction, the circumferential wall 351 and the base 352 which face the second gap 37 hardly deform radially outwardly. Thereby, the combustion gas passes through the circumferential wall 351 and the base 352 which face the second gap 37, and as a result, the cooling and filtering effects are enhanced. As described above, since a function of the filter is exerted as designed, an output of the gas generator is stable and the gas generator has high output reproducibility. Further, the combustion gas passes through a single cup-shaped filter 350 twice, so that the cooling effect and the filtering effect are enhanced as compared to a case in which the combustion gas passes through the filter only once. In comparison to a case in which a filter is disposed at a plurality of locations separately, an amount of filter is reduced, and components necessary for fixing a filter are omitted. Once the combustion gas enters an inside of the cup-shaped filter 350, combustion residues contained in the combustion gas adhere to and are easily collected by irregularities of an inner wall surface of the filter. Thus the space inside the cup-shaped filter functions as a combustion residue collecting space.

Figure 8:
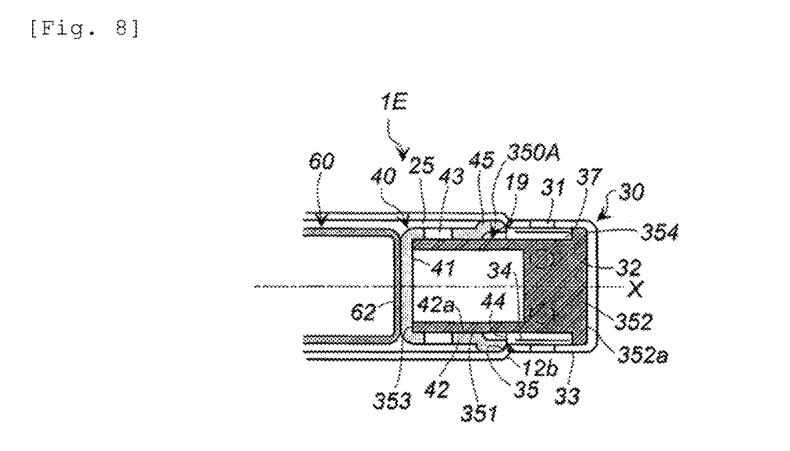
FIG. 8 shows a partial cross-sectional view in a direction of the axis X of a gas generator of another embodiment in which a filter is different from those in FIG. 1 to FIG. 7.

(6) Gas Generator of FIG. 8

The gas generator 1E shown in FIG. 8 is the same as the gas generator 1D shown in FIG. 6 except that a shape of a filter is partially different.

A cup-shaped filter 350A has an annular portion protruding radially outwardly from the outer end surface 352a of the base 352. The annular portion 354 abuts against both of the closed end surface 32 and the circumferential wall 33 of the diffuser portion 30 so as to radially support cup-shaped filter 350A on the side of the base 352.

The gas generator 1E shown in FIG. 8 operates in the same manner as the gas generator 1D shown in FIG. 6, whereby a similar effect is obtained. A function and an effect of the annular portion 354 are the same as those of the gas generator 1A shown in FIG. 2.

Figure 9:
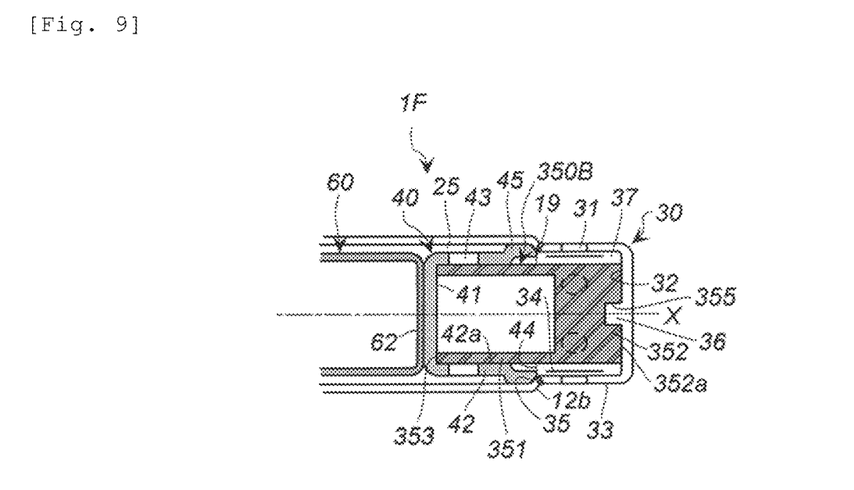
FIG. 9 shows a partial cross-sectional view in a direction of the axis X of a gas generator of another embodiment in which a filter is different from those in FIG. 1 to FIG. 8.

(7) Gas Generator of FIG. 9

The gas generator 1F shown in FIG. 9 is the same as the gas generator 1D shown in FIG. 6 except that a shape of a filter and a shape of a diffuser portion are partially different.

The cup-shaped filter 350B has a recess 355 in a central part of the outer end surface 352a of the base 352. The closed end surface 32 of the diffuser portion 30 has a protrusion 36 inwardly projecting from a central part of the closed end surface 32. In the gas generator 1F shown in FIG. 9, the protrusion 36 on the closed end surface 32 of the diffuser portion 30 is fitted into the recess 355 of the cup-shaped filter 350B. Thereby, the cup-shaped filter 350B is radially supported by the protrusion 36 and the recess 355 fitted to each other.

The gas generator 1F shown in FIG. 9 operates in the same manner as the gas generator 1D shown in FIG. 6, whereby a similar effect is obtained.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
    a cylindrical housing including a cylindrical housing main body portion and a diffuser portion;
    an ignition device provided at a first end of the cylindrical housing main body portion, and the diffuser portion provided with a plurality of gas discharge ports and closing a second end on the axially opposite side to the first end;
    a combustion chamber storing a gas generating agent and defined in an internal space of the cylindrical housing main body portion;
    a cup-shaped member separating the combustion chamber from the diffuser portion, the cup-shaped member having a bottom surface, a circumferential wall provided with a plurality of communication holes, and an opening, the cup-shaped member being disposed such that the bottom surface thereof is positioned on the side of the first end of the cylindrical housing main body portion,
    the opening thereof is positioned on the side of the second end, and
    a first gap which allows the combustion chamber to communicate with the diffuser portion, is formed between the circumferential wall thereof and an inner wall surface of the cylindrical housing main body portion to which the circumferential wall opposes radially outwardly; and
    a filter disposed in a space surrounded by the cup-shaped member and the diffuser portion, the filter being a cup-shaped filter having a base, a circumferential wall and an opening, and the filter being provided such that, the base of the filter abuts on a closed end surface of the diffuser portion,
    an end surface of the opening of the filter faces the bottom surface of the cup-shaped member, and
    the circumferential wall of the filter abuts, from inside, on the circumferential wall of the cup-shaped member including the plurality of the communication holes, and being disposed with a second gap formed between the circumferential wall of the cup-shaped filter and the gas discharge ports.

2. The gas generator according to claim 1, wherein the filter is the cup-shaped filter having an annular portion protruding radially outwardly from the base,
    the annular portion abuts against the closed end surface and the circumferential wall of the diffuser portion, an end surface of the opening of the filter is in touch with the bottom surface of the cup-shaped member.

3. The gas generator according to claim 1, wherein the filter is a cylindrical filter having a first circumferential wall having a larger inner diameter (r1) on the side of the cup-shaped member, a second circumferential wall having a smaller inner diameter (r2) on the side of the diffuser portion (r1>r2), and an annular surface formed between the first circumferential wall and the second circumferential wall by the difference in inner diameter,
    an end surface of the second circumferential wall of the filter abuts against the closed end surface of the diffuser portion, an end surface of the first circumferential wall abuts against the bottom surface of the cup-shaped member, the first circumferential wall abuts, from inside, against the circumferential wall of the cup-shaped member including the plurality of the communication holes, and the second circumferential wall is disposed with the second gap formed between the second circumferential wall and the gas discharge ports, and
    the plurality of the communication holes of the cup-shaped member face only the first circumferential wall of the cylindrical filter, and the plurality of the gas discharge ports of the diffuser portion face only the second circumferential wall of the cylindrical filter via the second gap.

4. The gas generator according to claim 1, wherein an axial thickness of the base of the cup-shaped filter is larger than a radial thickness of the circumferential wall of the cup-shaped filter,
    the end surface of the opening of the cup-shaped filter is in touch with the bottom surface of the cup-shaped member, a side surface of the base is disposed with a second gap formed between the side surface of the base and the gas discharge ports, and
    the plurality of the communication holes of the cup-shaped member face only the circumferential wall of the cup-shaped filter, and the plurality of the gas discharge ports of the diffuser portion face only the side surface of the base of the cup-shaped filter via the second gap.

5. The gas generator according to claim 4, wherein the filter is a cup-shaped filter having a base with a recess, the circumferential wall and the opening,
    the diffuser portion has a protrusion projecting inward from the closed end surface, and
    the protrusion on the closed end surface of the diffuser portion is fitted into the recess of the cup-shaped filter.

6. The gas generator according to claim 5, wherein the base of the cup-shaped filter has a length L1 of 0.3 to 0.7 L, where L is a length from an end surface of the base to an end surface of the opening of the cup-shaped filter, and
    based on L, a length L2 from the closed end surface of the diffuser portion to an end of the gas discharge port on the side of the cup-shaped member is in a range of 0.35 to 0.55L.

7. The gas generator according to claim 4, wherein the base of the cup-shaped filter has a length L1 of 0.3 to 0.7 L, where L is a length from an end surface of the base to an end surface of the opening of the cup-shaped filter, and
    based on L, a length L2 from the closed end surface of the diffuser portion to an end of the gas discharge port on the side of the cup-shaped member is in a range of 0.35 to 0.55L.

* * * * *